United States Patent [19]
Sawada et al.

[11] Patent Number: 5,317,648
[45] Date of Patent: May 31, 1994

[54] PROCESS FOR EXTRACTING A PARTICULAR COLOR IMAGE OF AN OBJECT AND A COLOR PROCESSING DEVICE THEREFOR

[75] Inventors: Kazuo Sawada, Hirakata; Kenji Sasaki, Moriguchi, both of Japan

[73] Assignee: Matsushita Electric Works, Ltd., Osaka, Japan

[21] Appl. No.: 890,823

[22] Filed: Jun. 1, 1992

[30] Foreign Application Priority Data

May 31, 1991 [JP] Japan .................. 3-130093

[51] Int. Cl.$^5$ .............................. H04N 7/18
[52] U.S. Cl. .................... 382/17; 364/526; 348/664
[58] Field of Search ............. 382/17; 358/28, 31, 358/80, 107; 364/526

[56] References Cited

U.S. PATENT DOCUMENTS

| | | | |
|---|---|---|---|
| 4,718,089 | 1/1988 | Hayashi et al. | 382/17 |
| 4,797,738 | 1/1989 | Kashi et al. | 364/526 |
| 4,812,903 | 3/1989 | Wagensonner et al. | 358/36 |
| 4,962,540 | 10/1990 | Tsujiuchi et al. | 382/17 |
| 4,985,759 | 1/1991 | Ito | 358/75 |
| 5,202,935 | 4/1993 | Kanamori et al. | 382/17 |

FOREIGN PATENT DOCUMENTS 59-5944  2/1984  Japan .
0206992  11/1984  Japan .................. 382/17

Primary Examiner—Curtis Kuntz
Assistant Examiner—Timothy J. May
Attorney, Agent, or Firm—Armstrong, Westerman, Hattori, McLeland & Naughton

[57] ABSTRACT

A color image processing system includes a color television camera monitoring an object to provide a video signal comprising three primary color components, and a color determination section which defines particular hue, chroma, and brightness regions. The video signal from the camera is analyzed at the color determination section in such a manner as to determine the video signal denotes the particular hue, chroma, and brightness when the three primary color components are found to fall within the particular hue, chroma, and brightness regions, respectively. Thus determined video signal is extracted as forming individual color signals indicating filtered images of the object with regard to the particular hue, chroma, and the brightness, respectively. A logic circuit is included in the system to perform a suitable logical function with regard to thus extracted color signals and to generate an output indicating an image of the object reflecting the result of the logical function, which is processed in an image deriving section to obtain geometrical characteristics including a location, area, and profile of the object with regard to a suitable combination of the filtered images.

3 Claims, 10 Drawing Sheets n=0.5 n=0.25 n=0

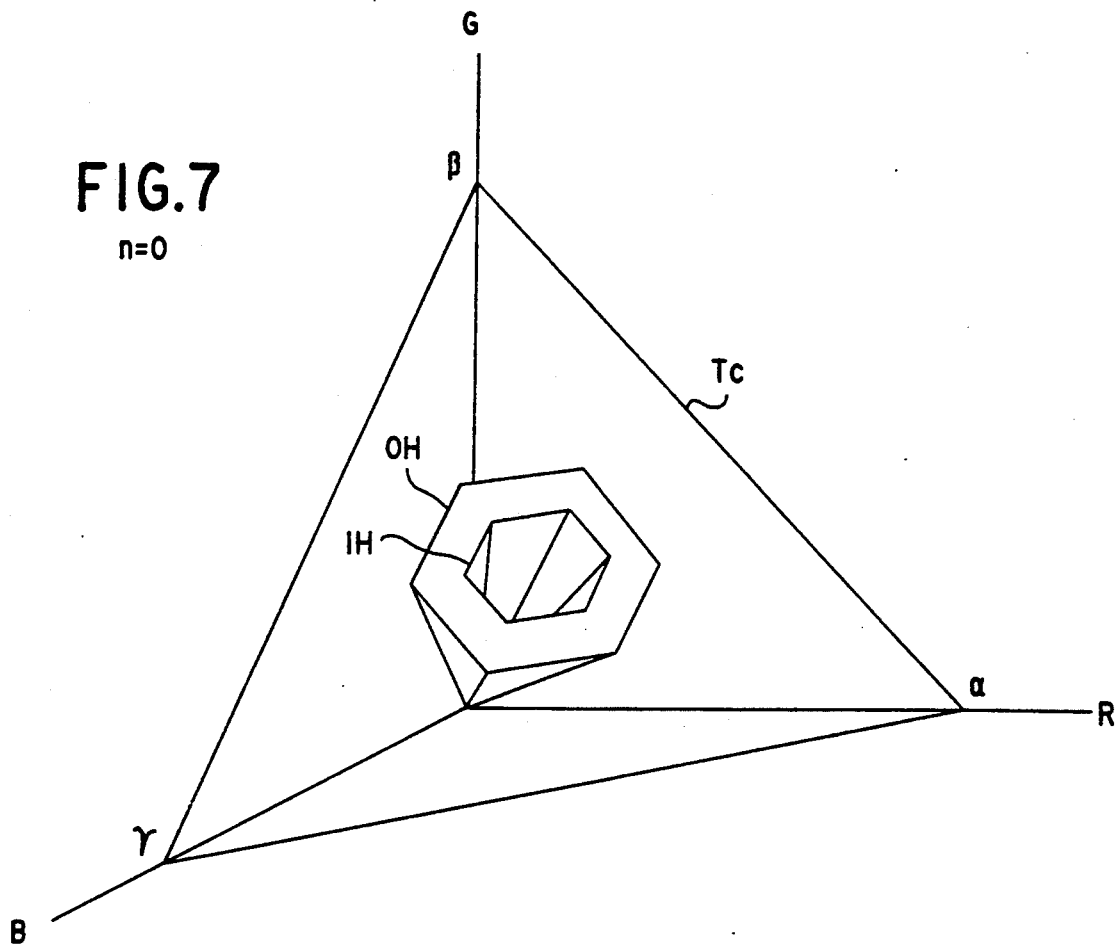

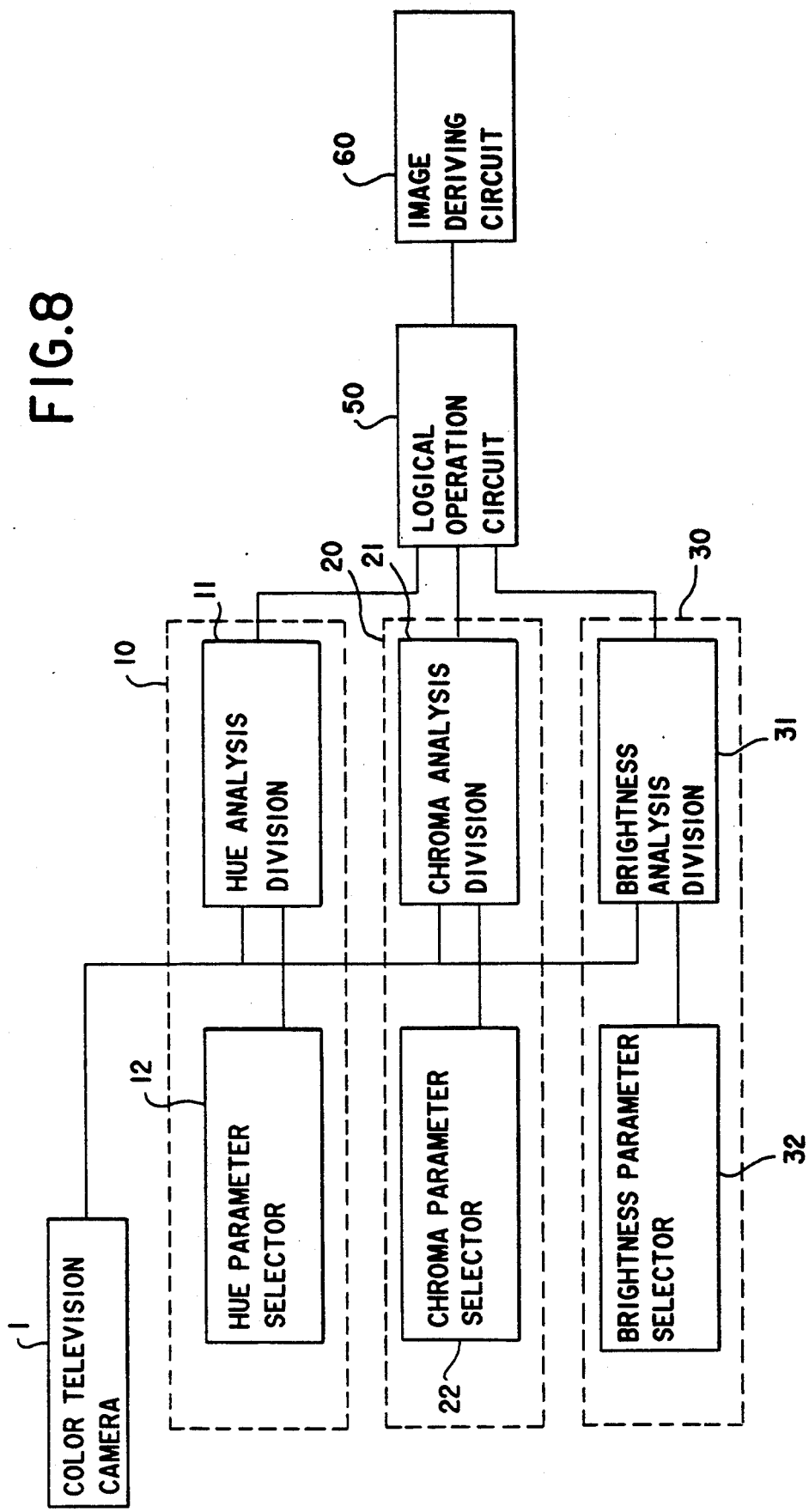

PROCESS FOR EXTRACTING A PARTICULAR COLOR IMAGE OF AN OBJECT AND A COLOR PROCESSING DEVICE THEREFOR

BACKGROUND OF THE INVENTION

1. Field of the Invention

The present invention relates to a process for extracting a particular color image of an object and a color processing device for deriving geometrical characteristics including a location, area, and profile of the object from the process.

2. Description of the Prior Art

For identification or inspection of an object or component in a factory assembly line, there has been proposed to utilizes a television camera to obtain a black-and-white image of the object and to process the image for deriving geometric characteristics of the object. Such process based on the black-and-white image is only available for identification in terms of the geometric characteristics and is therefore not able to distinguish the object by its color. To this end, another prior art process has been proposed to use a color television camera providing a video signal indicating a color image of the object and to process the video signal in such a manner as to extract a color image with regard to a particular color for obtaining the geometrical characteristics based upon the particular or filtered color image of the object. The particular color is generally selected and determined by the users to be a combination of three primary colors each having a suitable range of level. That is, when considering a color space defined by a coordinate system having coordinates of the three primary colors, the particular color can be determined within the color space as corresponding to a limited zone having the limited ranges of levels with respect to the three primary colors, respectively. However, such determination of the color is found not to be practical and reliable since the levels of the three primary colors will vary as the objects is monitored in varying illumination levels. To overcome this problem, it is also contemplated to elongate the zone by a certain extent in order to compensate for the variation in the illumination level as described in Japanese Patent Publication [kokoku] No. 59-5944. Nevertheless, a critical problem remains in this process in that it can not select the hue, chroma, and brightness independently from each other. For example, it is not possible to extract an image of the object having the same chroma but having different hue.

SUMMARY OF THE INVENTION

The above problems and insufficiencies have been eliminated in the present invention which provides an improved process of extracting a particular color image of an object. The improved process in accordance with the present invention presents an unique determination of a color of the object as to hue and chroma, independently from each other. The process utilizes a color television camera which monitors the object and provides a video signal comprising three primary color components, and utilizes a rectangular coordinate system to define a color space. The rectangular coordinate system has three mutually perpendicular coordinates designating the three primary color components, respectively and has an achromatic color axis extending through an origin of the coordinate system to designate a color with no hue and chroma.

For hue determination, a pair of hue separation planes are selected to extend through the achromatic axis and circumferentially spaced from each other about the achromatic axis so as to define a particular hue region bounded between the two hue separation planes. The video signal is then analyzed with respect to the three primary color components within the color space such that the video signal is determined to denote a particular hue when the three primary color components are found to fall within the particular hue region, whereby extracting the video signal as a particular color signal indicating a filtered image of the object with regard to the particular hue. Since the particular hue region bounded between the hue separation planes expands along and also in the radial direction of the achromatic axis within the color space of the coordinate system, it includes all regions of brightness and chroma. Therefore, the particular hue region is able to be selected independently of any variations of brightness and chroma. The particular hue region can be also narrowed or widened simply by angularly displacing the hue separation planes about the achromatic axis.

Accordingly, it is a primary object of the present invention to provide an improved process of extracting a particular color image of an object which is capable of readily selecting to narrow or widen a particular hue region independently of variations of chroma and brightness for obtaining a color image of the object with regard to the selected particular hue.

In a preferred embodiment of the invention, each of the hue separation planes is defined by the following equation:

$$X - Y = h(2X - Y - Z) [0 \leq h \leq 1]$$

wherein X, Y, and Z are coordinates, respectively of the rectangular coordinate system, and h is a hue parameter. Therefore, varying the parameter h alone causes the hue separation plane to angularly displace about the achromatic axis, thereby narrowing or widening the particular hue region defined between the hue separation planes. Also since the hue separation plane is expressed in a simple form of the above equation, extraction of the color signal can be effected in a simple manner without requiring rather complicated calculations, enabling real-time processing.

Therefore, it is an another object to provide an improved process which is capable of extracting a color image of a particular hue easily on real-time basis.

For chroma determination, the rectangular coordinate system has a color triangle which includes its three vertices located on the respective coordinates at points equidistant from the origin of the coordinate system. A particular chroma region is selected within the color space between an outer triangular pyramid and an inner triangular pyramid. The outer triangular pyramid essentially consists of three outer chroma separation planes which extend through the origin of the coordinate system and respectively through three outer lines which are selected within the color triangle to extend in parallel with the three sides of the color triangle, respectively around the achromatic axis. The inner triangular pyramid essentially consists of three inner chroma separation planes which extend through the origin of the coordinate system and respectively through three inner lines which are selected within the color triangle to extend in parallel with the three sides of the color triangle, respectively around the achromatic axis. The video signal is then analyzed with respect to the three primary color components within the color space such that the video signal is determined to denote a particular chroma when the three primary color components are found to fall within the particular chroma region, whereby extracting the video signal as a particular color signal indicating a filtered image of the object with regard to the particular chroma. Since the particular chroma region within the color space between the outer triangular pyramid and the inner triangular pyramid is an annular region and expands in the direction of the achromatic axis and at the same time radially outwardly within the color space of the coordinate system, it includes all regions of hue and brightness. Therefore, the particular chroma region is able to be selected independently of any variations of brightness and hue.

Accordingly, it is a further object of the present invention to provide an improved process of extracting a particular color image of an object which is capable of readily selecting to narrow or widen a particular chroma region surrounded by an outer and an inner triangular pyramid independently of variations of hue and brightness for obtaining a color image of the object with regard to the selected particular chroma.

For chroma determination, a particular chroma region is selected within the color space between an outer hexagonal pyramid and an inner hexagonal pyramid. The outer hexagonal pyramid essentially consists of six outer chroma separation planes which extend through the origin of the coordinate system and respectively through six outer lines which are selected within the color triangle in three pairs with each pair comprising two parallel lines arranged on opposite of the achromatic axis in a parallel relation commonly with each one of the three sides of the color triangle. The inner hexagonal pyramid essentially consists of six inner chroma separation planes which extend through the origin of the coordinate system and respectively through six inner lines which are selected within the color triangle in three pairs with each pair comprising two parallel lines arranged on opposite of the achromatic axis in a parallel relation commonly with each one of the three sides of the color triangle. The video signal is then analyzed with respect to the three primary color components within the color space such that the video signal is determined to denote a particular chroma when the three primary color components are found to fall within the particular chroma region, whereby extracting the video signal as a particular color signal indicating a filtered image of the object with regard to the particular chroma. Since the particular chroma region within the color space between the outer hexagonal pyramid and the inner hexagonal pyramid is an annular region and expands in the direction of the achromatic axis and at the same time radially outwardly within the color space of the coordinate system, it includes all regions of hue and brightness. Therefore, the particular chroma region is able to be selected independently of any variations of brightness and hue.

Accordingly, it is a further object of the present invention to provide an improved process of extracting a particular color image of an object which is capable of readily selecting to narrow or widen a particular chroma region surrounded by an outer and an inner hexagonal pyramid independently of variations of hue and brightness for obtaining a color image of the object with regard to the selected particular chroma.

In a preferred embodiment of the invention, each of the chroma separation planes is defined by the following equation [1]:

$$X - \frac{Y+Z}{2} = C \cdot (X + Y + Z) \ [0 \leq C \leq 1] \quad [1]$$

wherein X, Y, and Z are coordinates, respectively of the rectangular coordinate system, and C is a chroma parameter. Therefore, varying the parameter C alone causes the chroma separation plane to displace in parallel with a corresponding one of the three sides of the color triangle, thereby narrowing and widening the particular chroma region. Also since the chroma separation plane is expressed in a simple forms of the above equation, extraction of the color signal can be effected in a simple manner without requiring rather complicated calculations, enabling rapidly processing.

It is therefore a further object of the present invention to provide an improved process of extracting a particular color image of an object which is capable of readily selecting to narrow or widen a particular chroma region independently of variations of chroma and brightness for extracting a color image of the object with regard to the selected particular chroma easily and rapidly.

In a preferred embodiment of the invention, the chroma parameter C for a particular one of the three primary color components is determined by combining the following equation [2] into the above equation [1];

$$F(\alpha) = (1+n) \cdot |\alpha| - n \cdot \alpha \quad [2]$$

where $\alpha$ is $X - (Y+Z)/2$, and n is a positive number. The n number is selected in the following region; $0 \leq n \leq 0.5$. The equation [1] combined with the equation [2] indicates a pair of the chroma separation planes which are selected on the opposite of the achromatic axis in such a manner as to define in the chroma separation planes, respectively two colors which have the same chroma level but are of opposite hue to each other. Therefore, varying the chroma parameter C alone causes the pair of the chroma separation planes to displace at the same time on opposite of the achromatic axis in parallel with a corresponding one of the three side of the color triangle, thereby narrowing and widening the particular chroma region. And also, varying the n number causes the particular chroma region to change its configuration, that is, the hexagonal pyramid or the triangular pyramid. When the n number is 0.5, the particular chroma region consists of the color space between the outer triangular pyramid and the inner triangular pyramid as shown in FIG. 6(A). On the other hand, when the n number is not 0.5, the particular chroma region consists of the color space between the outer hexagonal pyramid and the inner hexagonal pyramid as shown in FIG. 6(B) and (C). Since the pair of the chroma separation planes is expressed in a simple form of the equation [1] combined with the equation [2], extraction of the color signal can be effected in a further simple manner without requiring rather complicated calculations, enabling real-time processing.

It is therefore a further object of the present invention to provide an improved process of extracting a particular color image of an object which is capable of readily selecting to narrow or widen a particular chroma region and changing a configuration of the particular chroma region independently of variations of chroma and brightness for extracting a color image of the object with regard to the selected particular chroma easily on real-time basis.

For chroma determination, a limited area adjacent around the achromatic axis is selected to define within the color space an achromatic region of the hexagonal pyramid or the triangular pyramid to have a cross-section in the form of a hexagon or a triangle about the achromatic axis in the color triangle. Therefore, the achromatic region can be selected independently of any variations of brightness and hue. And also, since the achromatic region consists of a particular chroma region of certain level or less, a white color of the object can be extracted from the achromatic region.

Accordingly, it is a further object of the present invention to provide an improved process of readily and reliably extracting a filtered image of an achromatic colored area within the surface of an object being monitored, or the area having a less chromatic value.

A color processing device comprises a monitoring unit including the color television camera, a plurality of pre-processing units and an image deriving unit. Each of the pre-processing units includes a hue determination section, a chroma determination section and a brightness determination section. The hue and chroma determination sections operate on the above-described principle to extract the particular color signals respectively indicating the filtered image of the object with regard to particular hue and chroma. In the brightness determination section, the video signal of the object is provided from the television camera, and then the video signal is analyzed with respect to the three primary color components to extract the video signal as a particular color signal indicating a filtered image of the object with regard to particular brightness. A logic circuit section performs a logical function with regard to the extracted color signals and provides an output indicating an image of the object reflecting the result of the logical function. An image deriving unit for processing the output of the logic circuit section provides geometrical characteristics including a location, area, and profile of the object. And besides, for a preferred embodiment, each of the pre-processing units has an input terminal, an output terminal and a feed terminal. The input terminal receives the video signal from the color television camera. The output terminal provides the output from the logic circuit section. The feed terminal passes the video signal therethrough to the input terminal of the other one of the pre-processing units. With this arrangement, the pre-processing units can be selected to have different regions with respect to at least one of the hue, chroma and brightness regions so that the units provide individual outputs indicative of different filtered images. Thus obtained outputs can be then processed in the image deriving section to provide a composite image reflecting the outputs from all of the pre-processing units, which is therefore a still further object of the present invention.

BRIEF DESCRIPTION OF THE DRAWINGS

FIG. 7 shows a particular chroma region including all hue and brightness defined in the present invention;

FIG. 8 is a block diagram of a color processing device of the present invention;

DETAILED DESCRIPTION OF THE PREFERRED EMBODIMENT

Figure 1:
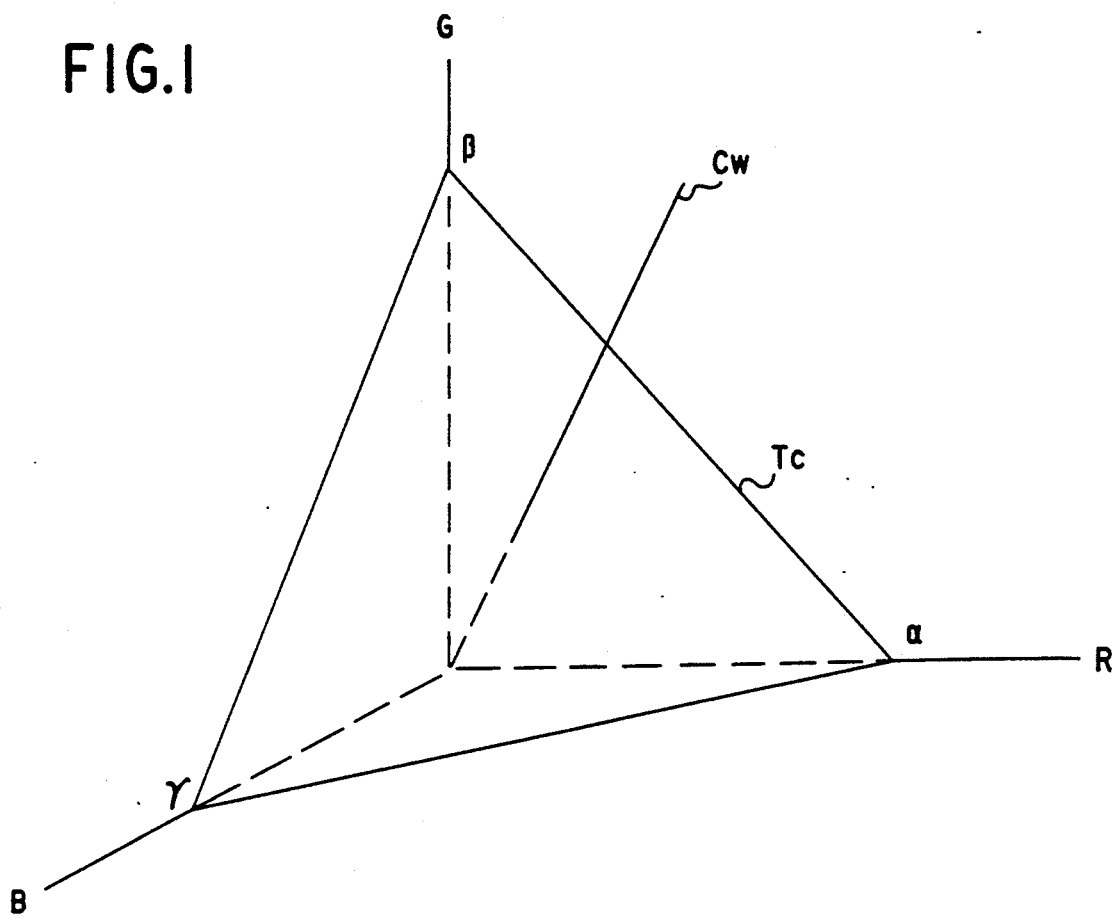
FIG. 1 shows a color space defined by a rectangular coordinate system having three mutually perpendicular coordinates corresponding to three primary color components, "Red" "Green" and "Blue", respectively and an achromatic color axis "Cw" extending through an origin of the coordinate system to designate a color with no hue and chroma, and also a color triangle "Tc" which has its three vertices located on the respective coordinates at points equidistant from the origin.

In an example of the present invention, an object was monitored by a color television camera to provide a video signal comprising three primary color components. A hue determination section, a chroma determination section and a brightness determination section was provided for extracting the video signal as color signals indicating particular hue, chroma and brightness, respectively. A rectangular coordinate system was utilized to define a color space. The coordinate system consisted of three mutually perpendicular coordinates, "Red", "Green" and "Blue", respectively as shown in FIG. 1. However, the coordinate system consisting of another three primary colors is also available into the present invention. A color was denoted as a coordinate (R,G,B) in the coordinate system. An origin (0,0,0) of the coordinate system represents zero energy of light. An achromatic color axis "Cw" having no hue and chroma extends through the origin (0,0,0) and a coordinate (1,1,1). A color triangle "Tc" is perpendicular to the achromatic axis "Cw" and has its three vertices located on the respective coordinates at point equidistant from the origin. Each vertex of the color triangle "Tc" was determined as $\alpha$, $\beta$ and $\gamma$, respectively as shown in FIG. 1.

[HUE DETERMINATION SECTION]

A principle for extracting a color signal corresponding to a particular hue region from the video signal of the object is explained below.

Figure 2:
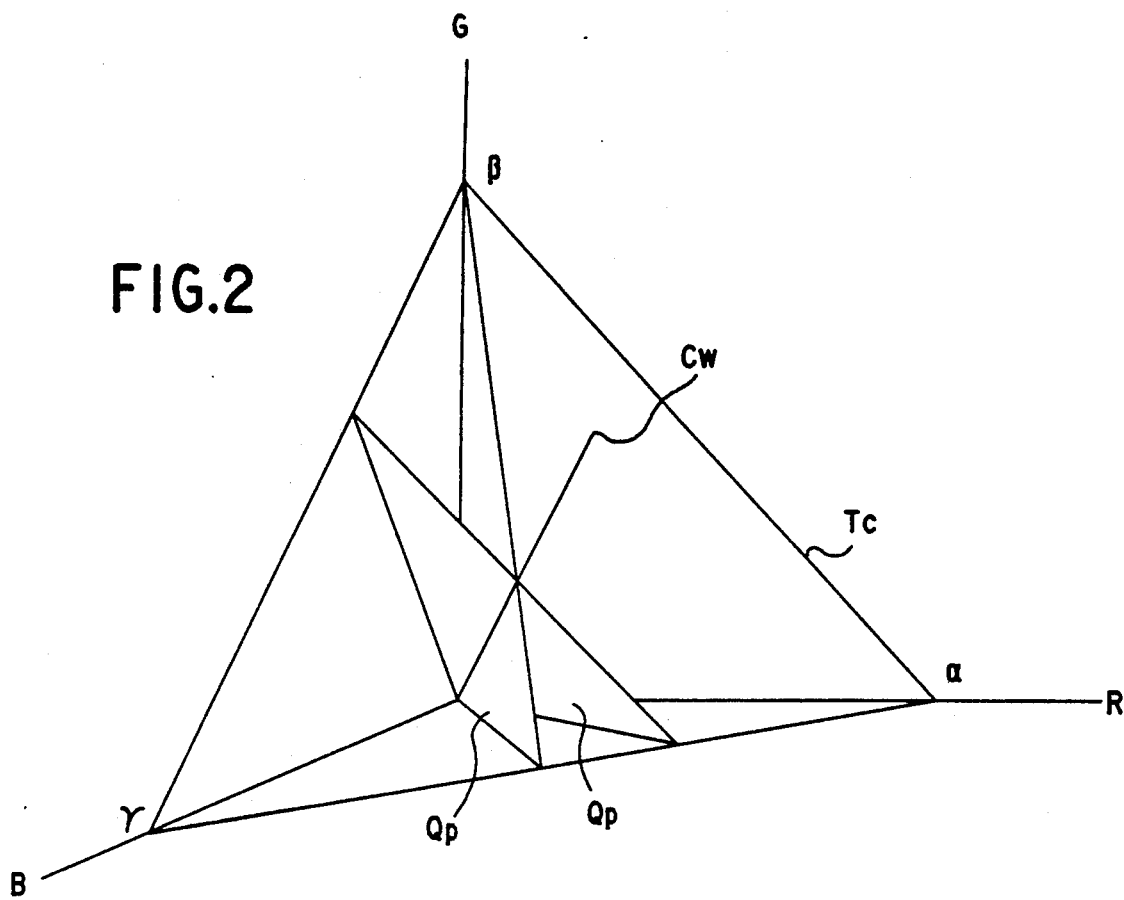
FIG. 2 shows two hue separation planes "Qp" arbitrarily arranged in the coordinate system in accordance with the present invention.

General equation of a plane is expressed by the following equation (1);

$$r \cdot R + g \cdot G + b \cdot B + V = 0 \quad (1)$$

wherein r, g, b and v are coefficients, and R, G and B are each component of the coordinate of the color. A hue separation plane "Qp" including the coordinate of the color and the achromatic axis "Cw" is provided by substituting the coordinates (0,0,0) and (1,1,1), respectively in the equation (1) as shown in FIG. 2. That is to say, the hue separation plane is represented by the following equation (2):

$$r \cdot R + g \cdot G + b \cdot B = 0 \ (r + g + b = 0) \quad (2)$$

Three coefficients, "r", "g" and "b" are able to be substituted by three equations including a hue parameter which satisfy the following condition; $r + g + b = 0$. That is, each of the three coefficients is expressed by the following equations (3), (4) and (5);

$$r = 2hr - 1 \quad (3)$$

$$g = -hr \quad (4)$$

$$b = -hr + 1 \quad (5)$$

wherein "hr" is the hue parameter about red-cyan color. When substituting the equations (3),(4),(5) in the equation (2), the equation (2) is also expressed by the following equation (6):

$$R - B = hr \cdot (2R - G - B) \quad (6)$$

The hue separation plane "Qp" expressed by the equation (6) is perpendicular to the color triangle "Tc" as shown in FIG. 2. A line of intersection of the plane "Qp" with the triangle is circumferentially selected about the achromatic axis "Cw" by varying the parameter "hr" with the following condition; $0 \leq hr \leq 1$. That is to say, when $hr = 0$, the equation (6) is also equal to the following equation (7);

$$B = R \quad (7)$$

Figure 3:
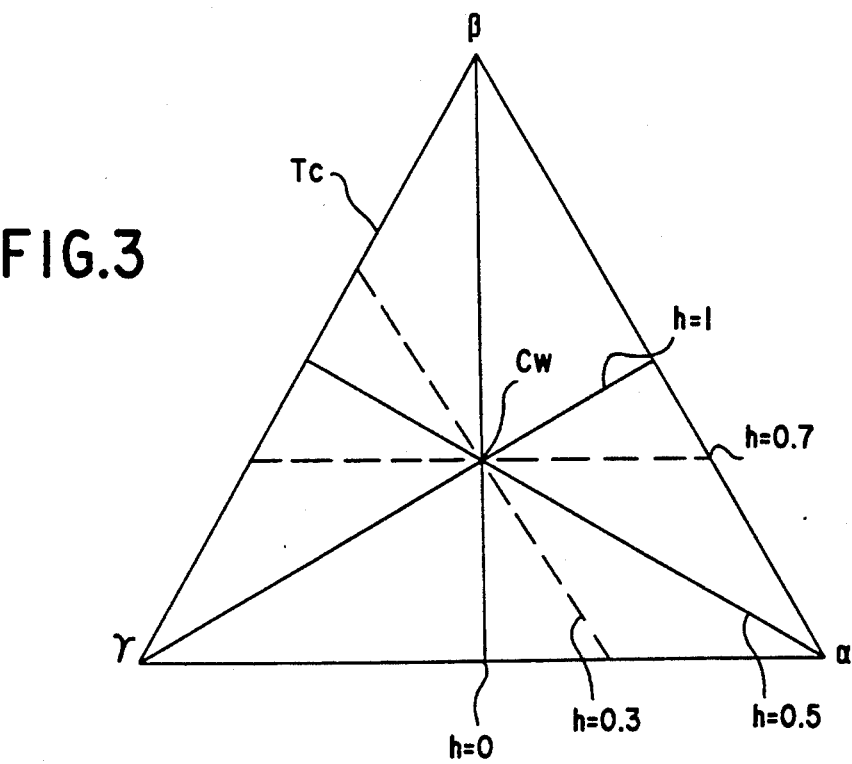
FIG. 3 shows intersection lines of the color triangle and the hue separation planes "Qp" selected by varying a hue parameter (h) in accordance with the present invention.

A line of intersection of the plane "Qp" with the color triangle "Tc" expressed by the equation (7) is a perpendicular bisector of $\alpha\gamma$ which is a side of the color triangle "Tc" as shown in FIG. 3. Similarly, when $hr = 0.5$, the equation (6) is the following equation (8);

$$G = B \quad (8)$$

A line of intersection of the plane "Qp" with the color triangle "Tc" expressed by the equation (8) is a perpendicular bisector of $\beta\gamma$ which is an another side of the color triangle "Tc". When $hr = 1$, the equation (6) is equal to the following equation (9);

$$R = G \quad (9)$$

A line of intersection of the plane "Qp" with the color triangle "Tc" expressed by the equation (9) is a perpendicular bisector of $\alpha\beta$. By the way, a particular hue region bounded parameters "hr" is expressed by the following inequality (10);

$$hr1 \cdot (2R - G - B) \leq R - B \leq hr2 \cdot (2R - G - B) \quad (10)$$

wherein hr1 and hr2 are the hue parameters and satisfy the following condition; $0 \leq hr1 \leq hr2 \leq 1$. The particular hue region determined by the above inequality (10) consists of mainly red color. On the other hand, A particular hue region having the opposite hue of red color is expressed by the following inequality (11);

$$hr2 \cdot (2R - G - B) \leq R - B \leq hr1 \cdot (2R - G - B)$$
$$(0 \leq hr1 \leq hr2 \leq 1) \quad (11)$$

The particular hue region expressed by the equation (11) consists of mainly cyan color. Similarly, When substituting the following equations (12),(13),(14) in the equation (2), the equation (2) is also expressed by the following equation (15);

$$r = -hg + 1 \quad (12)$$

$$g = 2hg - 1 \quad (13)$$

$$b = -hg \quad (14)$$

$$G - R = hg \cdot (2G - B - R) \text{ wherein "hg" is a parameter} \quad (15)$$

about green-magenta color. A particular hue region bounded between two hue separation planes "Qp" with different hue parameters "hg" is expressed by the following inequality (16);

$$hg1 \cdot (2G - B - R) \leq G - R \leq hg2 \cdot (2G - B - R) \quad (16)$$

wherein hg1 and hg2 are the hue parameters, respectively and selected in a region of $0 \leq hg1 \leq hg2 \leq 1$. The particular hue region determined by the equation (16) consists of mainly green color. On the other hand, a particular hue region having the opposite hue of green color is expressed by the following inequality (17);

$$hg2 \cdot (2G - B - R) \leq G - R \leq hg1 \cdot (2G - B - R)$$
$$(0 \leq hg1 \leq hg2 \leq 1) \quad (17)$$

The particular hue region expressed by the equation (17) consists of mainly magenta color. Similarly, When substituting the following equations (18),(19),(20) in the equation (2), the equation (2) is also expressed by the following equation (21);

$$r = -hb \quad (18)$$

$$g = -hb + 1 \quad (19)$$

$$b = 2hb - 1 \quad (20)$$

$$R - B = hb \cdot (2B - R - G) \quad (21)$$

wherein "hb" is a parameter about blue-yellow color. A particular hue region bounded between two hue separation planes "Qp" with different hue parameters "hb" is expressed by the following inequality (22);

$$hb1 \cdot (2B - R - G) \leq R - B \leq hb2 \cdot (2B - R - G) \quad (22)$$

wherein hb1 and hb2 are the hue parameters and satisfy the following condition; $0 \leq hb1 \leq hb2 \leq 1$. A particular hue region determined by the equation (22) consists of mainly blue color. On the other hand, a particular hue region having the opposite hue of blue color is expressed by the following inequality (23);

$$hb2 \cdot (2B - R - G) \leq R - B \leq hb1 \cdot (2B - R - G)$$
$$(0 \leq hb1 \leq hb2 \leq 1) \quad (23)$$

The particular hue region expressed by the equation (23) consists of mainly yellow color. Therefore, the hue parameters are also varied to widen and narrow the particular hue region. Thus, the particular hue region is selected in accordance with the above-described principle. A color signal corresponding to the particular hue region is extracted from the video signal of the object in such a manner as to determine the video signal as a particular hue when three primary color components of the video signal are found to fall with the particular hue region.

[CHROMA DETERMINATION SECTION]

Figure 4:
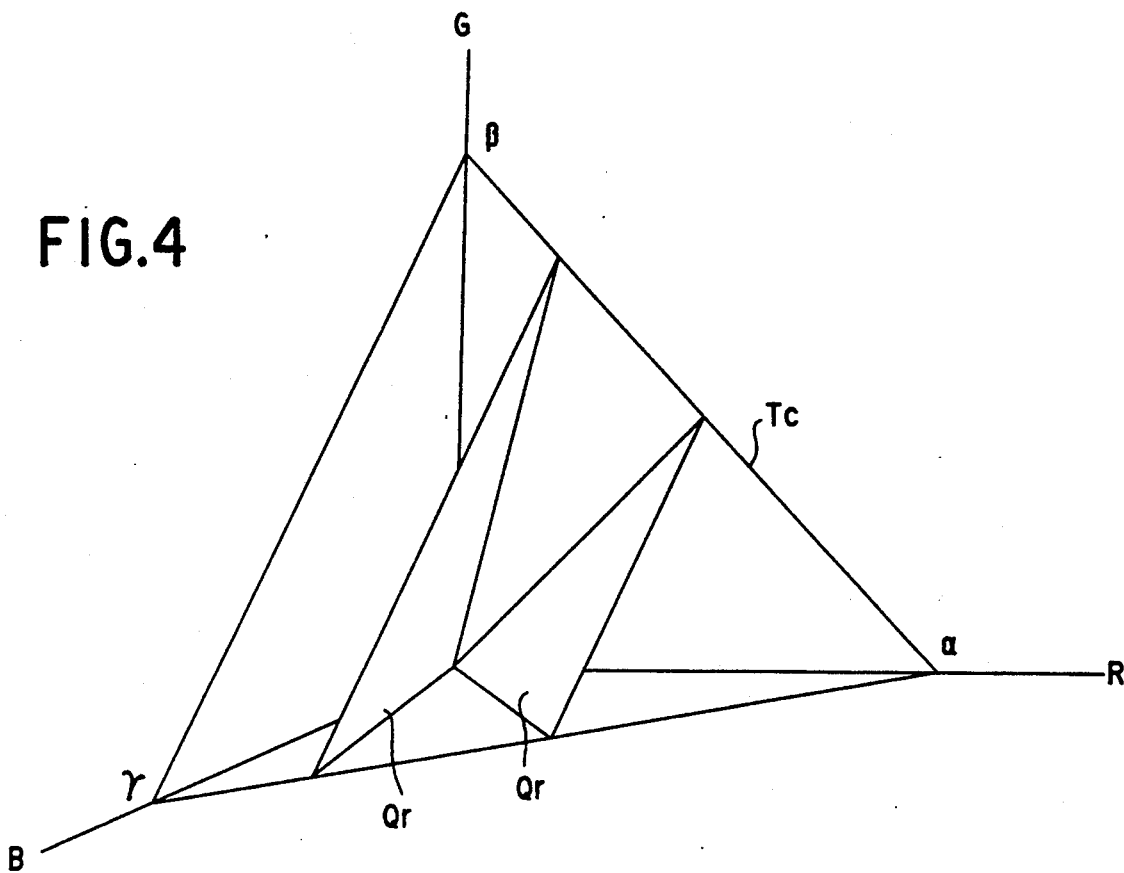
FIG. 4 shows two chroma separation planes "Qr" arbitrarily arranged in the coordinate system in accordance with the present invention.

A principle for extracting a color signal corresponding to a particular chroma region from the video signal is explained below. In the present invention, chroma separation planes "Qr" are arranged on opposite of the achromatic axis "Cw" with respect to three opposite hue, that is, red-cyan color, green-magenta color and blue-yellow color, respectively. When considering the chroma separation planes with respect to the red-cyan color, each of the chroma separation planes "Qr" extends through the origin (0,0,0) and through a line in parallel with a side $\gamma\beta$ of the color triangle "Tc", as shown in FIG. 4. The chroma separation plane also extends through the origin (0,0,0) and through a line of a intersection of two planes which are expressed by the following equation (24) and (25):

$$G+B=1 \qquad (24)$$

$$R=Pr \qquad (25)$$

wherein "Pr" is an arbitrary number and selected in a range of $0 \leq Pr < \infty$. A line of intersection of the chroma separation plane "Qr" with the color triangle "Tc" is arranged in parallel with the side $\beta\gamma$ of the color triangle between the side $\beta\gamma$ and the opposite vertex of $\alpha$ by selecting a value of "Pr" within the above range. Therefore, the chroma separation plane "Qr" is expressed by the following equation (26);

$$R=Pr \cdot (G+B), \ (0 \leq Pr < \infty) \qquad (26)$$

By the way, when "Pr" is defined by the following equation (27);

$$Pr = \frac{Cr + 0.5}{1 - Cr} \qquad (27)$$

wherein "Cr" is a chroma parameter about red-cyan color and selected in a range of $-0.5 \leq Cr \leq 1$, the equation (26) is also expressed by the following equation (28);

$$R - \frac{G+B}{2} = Cr \cdot (R+G+B) \qquad (28)$$

Figure 5:
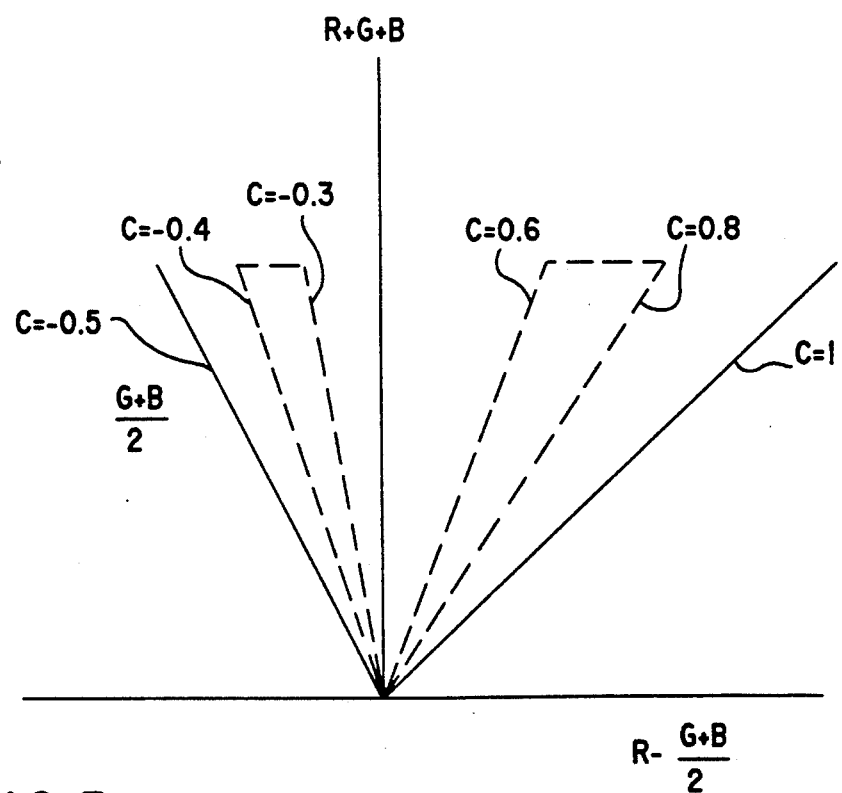
FIG. 5 shows the chroma separation planes "Qr" selected by varying a chroma parameter (c) within a rectangular coordinate system having two mutually perpendicular axes, each of which is in a direction of $(R-(G+B)/2)$ and a direction of $(R+G+B)$.

For discussing the equation (28), a rectangular coordinate system having two mutually perpendicular axes, each of which is in a direction of $(R-(G+B)/2)$ and a direction of $(R+G+B)$, was adopted. That is, when the chroma parameter "Cr" is selected in a range of $0 \leq Cr \leq 1$, the chroma separation plane "Qr" is arranged in parallel with the side $\beta\gamma$ between a center of gravity of the color triangle "Tc" and its vertex $\alpha$ as shown in FIG. 5. When the chroma parameter is selected in a range of $-0.5 \leq Cr \leq 0$, the chroma separation plane "Qr" is arranged in parallel with the side $\beta\gamma$ from the center of gravity and the side $\beta\gamma$. Since two chroma separation planes having same chroma level but having the opposite hue are arranged on opposite of the achromatic axis "Cw" in parallel with the side $\beta\Delta$, the two chroma separation planes are represented by combining the following chroma function F(X) (29) into the equation (28);

$$F(X)=(1+n) \cdot |X| - n \cdot X \qquad (29)$$

wherein, X is $(R-(G+B)/2)$ with respect to the red-cyan color and $|X|$ is an absolute value of X, and n is selected in a range of $0 \leq n \leq 0.5$. That is to say, the hue separation "Qp" planes are expressed by the following equation (30);

$$F\left(R - \frac{G+B}{2}\right) = Cr \cdot (R+G+B) \qquad (30)$$

Similarly, two chroma separation planes "Qr" having same chroma level but having the opposite hue arranged in parallel respectively with the sides $\alpha\Delta$ and $\alpha\beta$ are expressed by the following equations (31) and (32);

$$F\left(G - \frac{R+B}{2}\right) = Cb \cdot (R+G+B) \qquad (31)$$

$$F\left(G - \frac{R+B}{2}\right) = Cg \cdot (R+G+B) \qquad (31)$$

$$F\left(B - \frac{R+G}{2}\right) = Cb \cdot (R+G+B) \qquad (32)$$

wherein $C_g$ and $C_b$ are chroma parameters for green-magenta color, blue-yellow color, respectively and selected in a range of $-0.5 \leq C_g, C_b \leq 1$.

By the way, two particular chroma regions, each of which is a color space between two chroma separation planes "Qr", are arranged on opposite of the achromatic axis "Cw" and in parallel with one side of the color triangle "Tc". The particular chroma regions have same chroma region but having the opposite hue. Therefore, the particular chroma regions arranged in parallel respectively with the sides of the color triangle "Tc" are expressed by the following inequalities, (33), (34), (35), (36), (37) and (38);

$$C_1 \cdot (R+G+B) \leq F\left(R - \frac{G+B}{2}\right) \qquad (33)$$

$$F\left(R - \frac{G+B}{2}\right) \leq C_2 \cdot (R+G+B) \qquad (34)$$

$$C_1 \cdot (R+G+B) \leq F\left(G - \frac{R+B}{2}\right) \qquad (35)$$

$$F\left(G - \frac{R+B}{2}\right) \leq C_2 \cdot (R+G+B) \qquad (36)$$

Figure 6A:
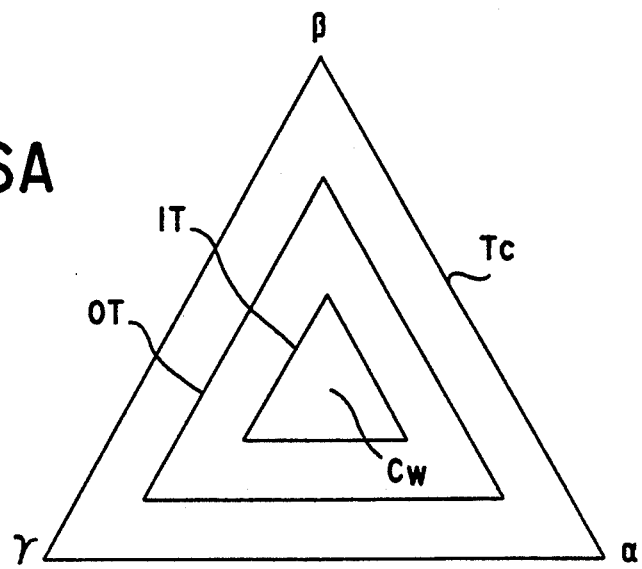
FIGS. 6A to 6C are schematic views illustrating cross-sections of different chroma regions which are defined for color analysis in accordance with the present invention.
Figure 6B:
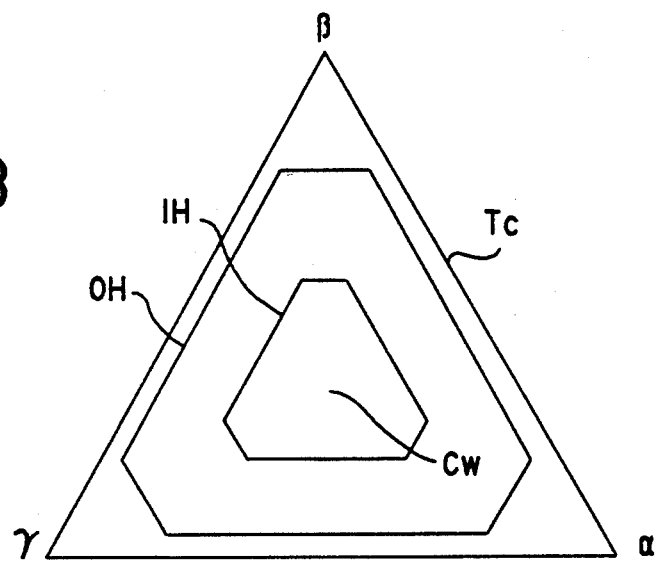
Figure 6C:
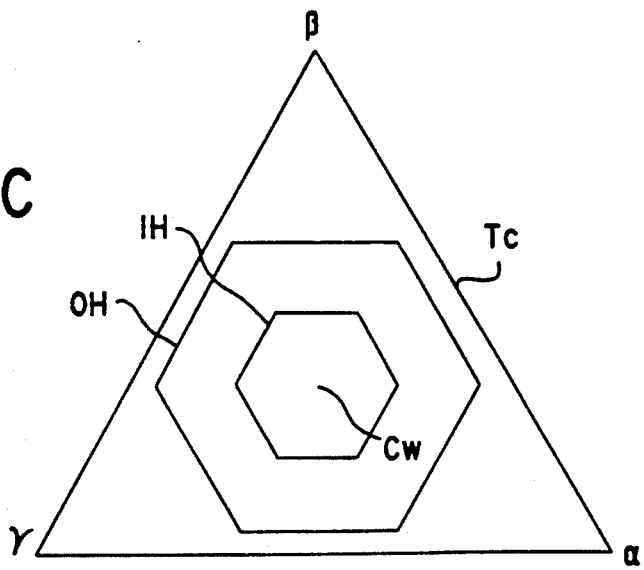

-continued $$C_1 \cdot (R + G + B) \leq F\left(B - \frac{R+B}{2}\right) \quad (37)$$

$$F\left(B - \frac{R+G}{2}\right) \leq C_2 \cdot (R + G + B) \quad (38)$$

wherein $C_1$ and $C_2$ are the chroma parameters, respectively and selected in a range of $0 \leq C_1 \leq C_2 \leq 1$. And besides, an inside region of an outer pyramid is expressed by the inequalities of (34) and (36) and (38). An outside region of an inner pyramid is expressed by the inequalities (33) or (35) or (37). Therefore, a particular chroma region having same chroma level independently of hue and chroma is represented by a color space between the outer and inner pyramids. Each value of the chroma parameters $C_1$ and $C_2$ are selected to widen and narrow the particular chroma region. A value of n included in the chroma functions determines configurations of the pyramid, that is, hexagonal pyramid or triangular pyramid. When n=0.5, it is a color space bounded between an outer triangular pyramid "TO" and an inner triangular pyramid "IT" as shown in FIG. 6A. The outer triangular pyramid essentially consists of three outer chroma separation planes which extend through the origin (0,0,0) of the coordinate system and respectively through three outer lines which are selected within the color triangle "Tc" to extend in parallel with the three sides of the color triangle, respectively around the achromatic axis "Cw". The inner triangular pyramid essentially consists of three inner chroma separation planes which extend through the origin of the coordinate system and respectively through three inner lines which are selected within the color triangle to extend in parallel with the three sides of the color triangle, respectively around the achromatic axis. On the other hand, when n≠0.5, it is a color space bounded between an outer hexagonal pyramid "OH" and an inner hexagonal pyramid "IH" as shown in FIG. 6B and 6C. The outer pyramid consists of six outer planes which extend through the origin and respectively through six outer lines which are selected within the color triangle "Tc" in three pair comprising two parallel lines arranged on opposite of the achromatic axis "Cw" in a parallel relation commonly with each one of the three sides of the color triangle. The inner hexagonal pyramid consists of six inner plane which extend through the origin and respectively through six inner lines which are selected with the color triangle in three pairs with each pair comprising two parallel lines arranged on opposite of the achromatic axis in a parallel relation commonly with each one of the three sides of the color triangle. That is to say, each of the outer and the inner hexagonal, which consists of one face of a hexagon in parallel with the color triangle and all other faces of triangles with a common vertex of the origin, is shown in FIG. 7. Thus, the particular chroma region is selected in accordance with the above-described principle. A color signal corresponding to the particular chroma region is extracted from the video signal of the object in such a manner as to determine the video signal as the particular chroma when three primary color components of the video signal are found to fall with the particular chroma region. [BRIGHTNESS DETERMINATION SECTION ]

A principle for extracting a color signal corresponding to a particular brightness region from the video signal is explained below. A brightness separation plane extends in parallel with the color triangle "Tc". The brightness separation plane has same brightness level independently of hue and chroma and is represented by substituting the coordinates (1,0,0), (0,1,0) and (0,0,1), respectively in the equation (2), that is to say, the plane is expressed by the following equation (39);

$$R+G+B+V=0 \quad (39)$$

wherein "V" is a brightness parameter and selected in a region of $0 \leq V$. A particular brightness region bounded between the brightness separation planes with different brightness parameters is expressed by the following inequality (40);

$$V1 \leq R+G+B+ \leq V2 \quad (40)$$

wherein, V1 and V2 are the brightness parameters, respectively and selected in a range of $0 \leq V1 \leq V2$. Each value of the brightness parameters are selected to widen and narrow the particular brightness region. Thus, the particular brightness region is selected in accordance with the above-described principle. A color signal corresponding to the particular brightness region is extracted from the video signal of the object in such a manner as to determine the video signal as the particular brightness when three primary color components of the video signal are found to fall with the particular brightness region. [A COLOR IMAGE PROCESSING DEVICE ]

A color image processing device for extracting the color signals corresponding to the particular hue, chroma and brightness from the video signal of the object is explained below. A block diagram of the color image processing device is shown in FIG. 8. The video signal of the object comprising three primary color components is provided by a color television camera 1. A pre-processing unit consists of a plurality of pre-processing sections, that is, a hue determination section 10, a chroma determination section 20, a brightness determination section 30 and logical Operation circuit 50. The hue determination section 10 consists of a hue parameter selector 12 and a hue analysis division 11. The chroma determination section 20 consists of a chroma parameter selector 22 and a chroma analysis division 21. The brightness determination section 30 consists of a brightness parameter selector 32 and a brightness analysis division 31, The logical operation circuit 50 performs a logical function with regard to the extracted color signals and provides an output indicating an image of the object reflecting the result of the logical function. The image deriving circuit 60 processes the output of the logical operation circuit 50 to derive geometrical characteristics including a location, area, and profile of the object.

Figure 9:
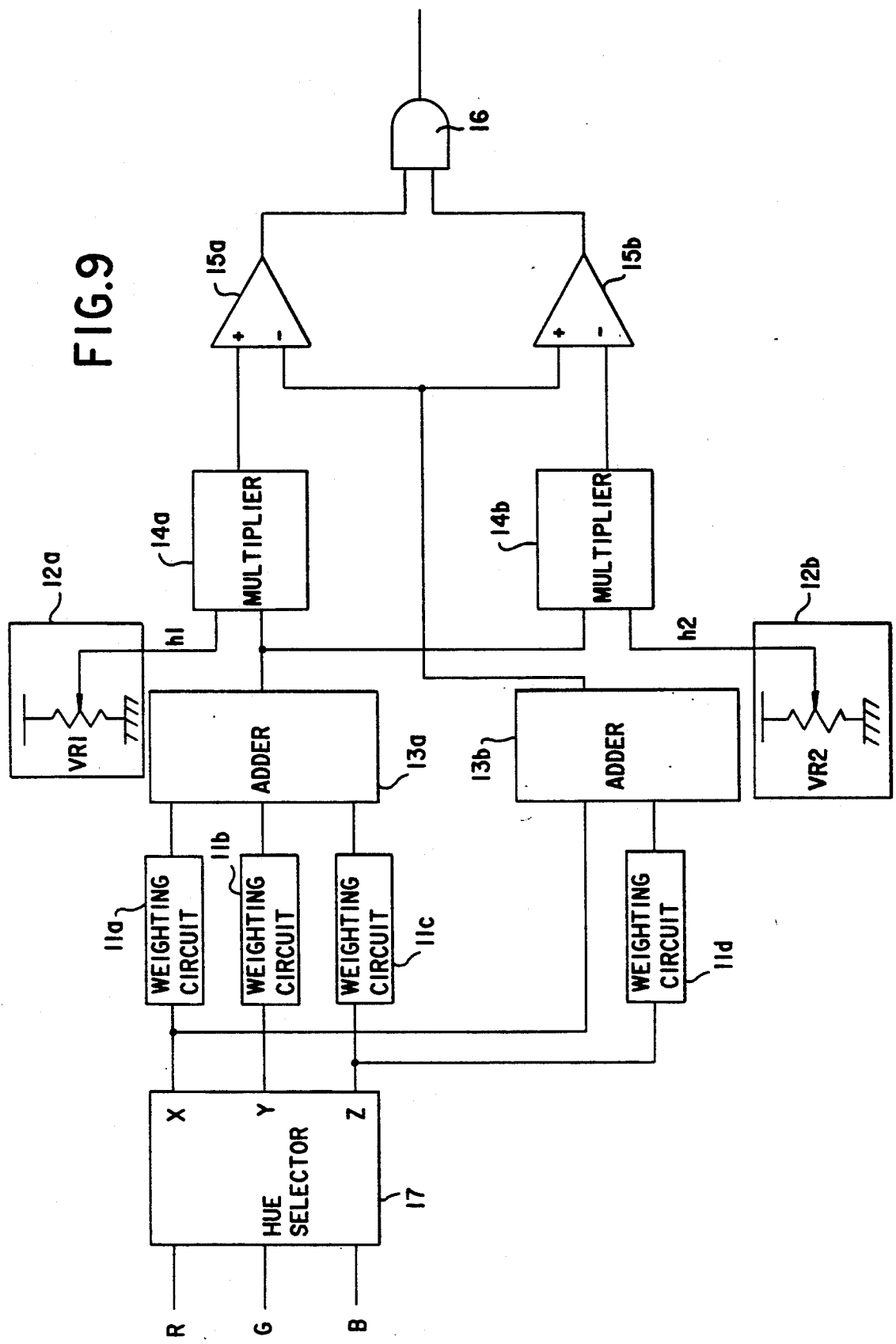
FIG. 9 is a circuit diagram of a hue determination section of the present invention.
Figure 10:
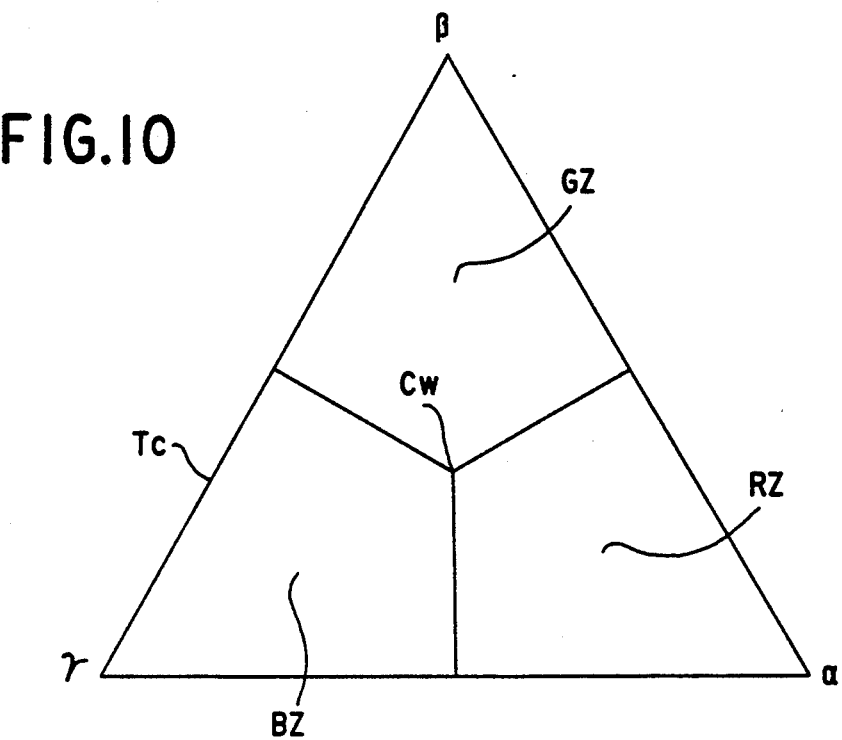
FIG. 10 shows a red color zone "RZ" arranged on the color triangle for the hue determination section.

A circuit diagram for the hue determination section 10 is shown in FIG. 9. Each of the three primary color components of the video signal, "R", "G" and "B" is determined, by a hue selector 17, as each of three input signals, "X", "Y" and "Z". When selecting "R" as the input signal "X" and "G" as the input signal "Y", respectively, the hue determination section 10 analyzes the video signal with respect to a color signal corresponding to particular hue regions arranged on a red color zone "RZ" as shown in FIG. 10. Each of the input signals is processed by particular coefficients at weighing circuits comprising 11a, 11b, 11c and 11d, i.e., the weighing circuit 11a multiplies the input signal "R" by "+2". The output signals from the weighing circuits 11a, 11b and 11c are sent to an adder 13a to calculate the following operation; 2R-G-B. On the other hand, the output signals from the weighing circuits 11a and 11d are sent to an adder 13b to calculate the following operation; R-B. And then, a calculated value at the adder 13a is sent to multipliers 14a and 14b to multiply the value by each of hue parameters of h1 and h2 which are selected by variable resistors VR1 and VR2, respectively. A calculated value at the adder 13b and a calculated value at the multiplier 14a are sent to a comparison circuit 15a to check the following inequality;

$$h1 \cdot (2R-G-B) \geq (R-B).$$

On the other hand, the calculated value at the adder 13b and a calculated value at the multiplier 14b are sent to a comparison circuit 15b to check the following inequality;

$$(R-B) \geq h2 \cdot (2R-G-B)$$

wherein the hue parameters are selected in a range of $0 \geq h2 \geq h1 \geq 1$ by the variable resistors VR1 and VR2. The hue parameters are also selected to widen and narrow the particular hue region expressed by the above inequalities.

Similarly, when selecting "G" as the input signal "X" and "B" as the input signal "Y", respectively, the hue determination section analyzes the video signal with respect to a color signal corresponding to particular hue region arranged on a green color zone "GZ" as shown in FIG. 10. And beside, when selecting "B" as the input signal "X" and "R" as the input signal "Y", respectively, the hue determination section analyzes the video signal with respect to a color signal corresponding to particular hue region arranged on a blue color zone "BZ" as shown in FIG. 10. Therefore, when the three primary color components of the video signal are included in the particular hue region expressed by the above two inequalities, the video signal is output as a binary signal "1" from an AND gate 16 and is determined to denote the particular hue so that the hue determination section provides a filtered image of the object.

Figure 11:
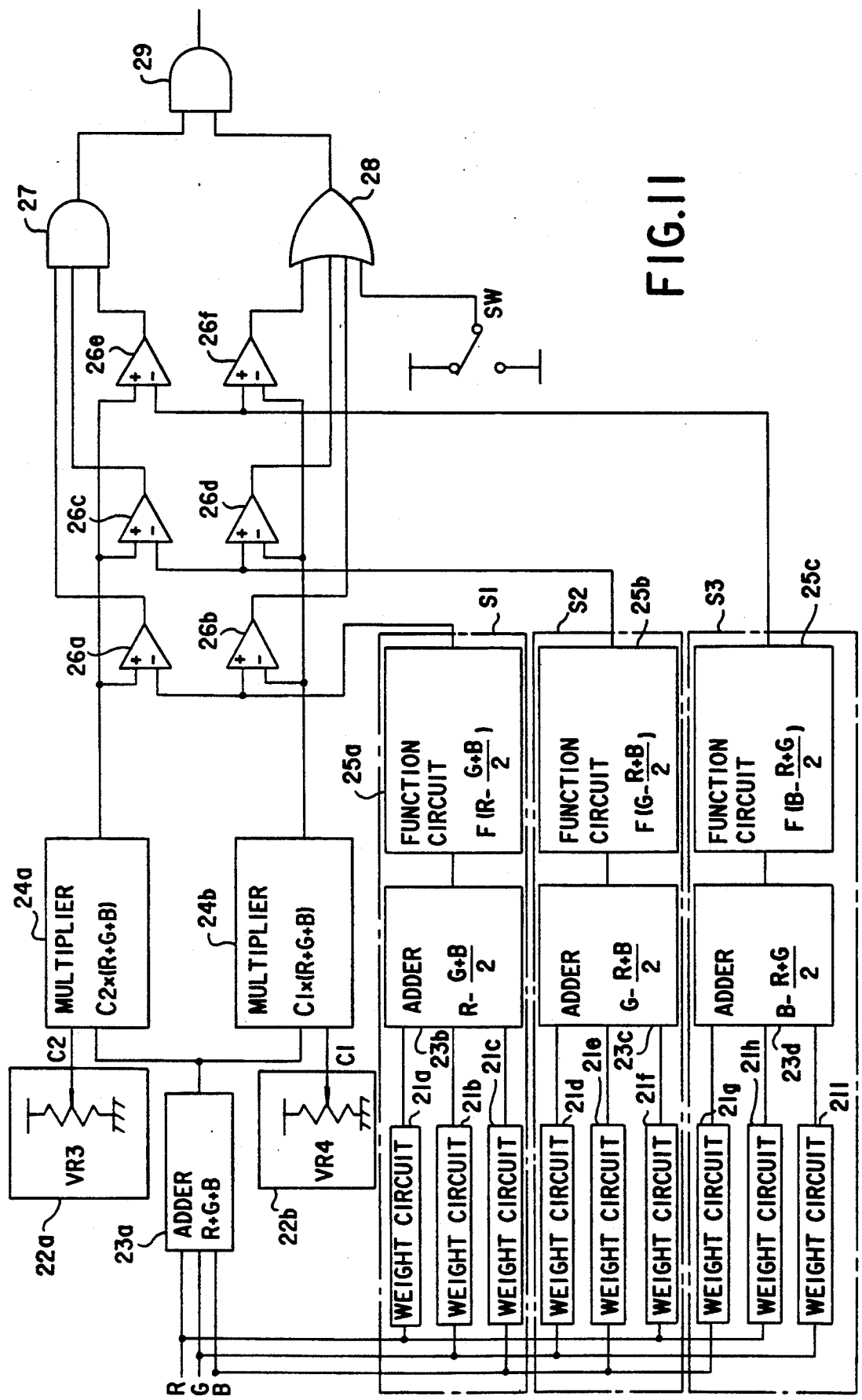
FIG. 11 is a circuit diagram of a chroma determination section of the present invention.

A circuit diagram for the chroma determination section 20 is shown in FIG. 11. Each of the three primary color components of the video signal is sent to three chroma stations S1, S2 and S3, respectively, each of which comprise three weighing circuits, an adder and a function circuits, to analyze particular chroma regions arranged on opposite of the achromatic axis with respect to three opposite hue, that is, red-cyan color, green-magenta color and blue-yellow color, respectively. When considering the chroma station S1 for analyzing the particular chroma regions with respect to the red-cyan color, each of the three color components, "R", "G" and "B" is sent to the weighing circuits 21a, 21b and 21c, respectively as shown in FIG. 11 so that the weighting circuits multiply each component by particular coefficients, i.e., the weighing circuit 21a multiplies "R" by "+1". And then, calculated values at the weighing circuits 21a, 21b and 21c are sent to an adder 23b to calculate the following operation; R-(G+B)/2. A calculated value at the adder 23b is sent to a function circuit 25a to calculate the following chroma function;

$$F\left(R - \frac{G+B}{2}\right) = (1+n) \cdot \left|R - \frac{G+B}{2}\right| - n \cdot R - \frac{G+B}{2}$$

wherein n is selected in a range of $0 \leq n \leq 0.5$. In the circuit diagram of FIG. 11, it has a particular n value selected in the above range. On the other hand, the three primary color components are also sent to an adder 23a to calculate the following operation; R+G+B. A calculated value at the adder 23a is sent to a multiplier 24a and 24b, respectively to multiply the value by the chroma parameters of C1 and C2, respectively which were selected by variable resistors VR3 and VR4. A calculated values at the function circuits 25a and a calculated value at the multiplier 24a are sent to a comparison circuit 26a to check the following inequality;

$$F\left(R - \frac{G+B}{2}\right) \leq C_2 \cdot (R + G + B) \quad (34)$$

On the other hand, the calculated value at the function circuits 25a and a calculated value at the multiplier 24b are sent to a comparison circuit 26b to check the following inequality;

$$C_1 \cdot (R + G + B) \leq F\left(R - \frac{G+B}{2}\right) \quad (33)$$

wherein the chroma parameters are selected in a region of $0 \leq C1 \leq C2 \leq 1$. A particular chroma regions represented by the above inequalities have same chroma region but having the opposite hue of red-cyan color. Similarly, when considering the chroma station for analyzing the particular chroma regions with respect to the green-magenta color, a particular chroma region have same chroma regions but having the opposite hue of the green-magenta color. And besides, when considering the chroma station for analyzing the particular chroma regions with respect to the blue-yellow color, a particular chroma region have same chroma regions but having the opposite hue of the blue-yellow color. Therefore, as described in the [CHROMA DETERMINATION SECTION], the particular chroma region having same chroma region independently of hue is the color space between the outer and the inner pyramids. When the binary signal "1" is output from the AND gate 27, the video signal is determined to denote a color signal corresponding to an inside chroma region of the outer pyramid. On the other hand, when the binary signal "1" is output from the OR gate 28, the video signal is determined to denote a color signal corresponding to an outside chroma region of the inner pyramid. Accordingly, when the binary signal "1" is output from an AND gate 29, the video signal is determined to denote a color signal corresponding to the particular chroma region between the outer and the inner pyramids so that it provides a filtered image of the object. The chroma parameters of C1 and C2 are also selected to widen and narrow the particular chroma region.

By the way, a switch SW1 is provided to give the binary signal "1" or "0" to the OR gate 28 and it normally arranged to give the binary signal "0". When the switch is turned so as to provide the binary signal "1", the OR gate 28 always provides the binary signal "1" irrespective of the output signals from the comparison circuits 26b, 26d and 26f. Therefore, when the binary signal "1" is output from the AND gate 27 and the binary signal "1" is always output from the OR gate 28 by the switch SW1, the video signal is determined to denote a color signal corresponding to the inside region of the outer pyramid, which consists of a particular chroma level or less so that it provides a gray value image of the object.

Figure 12:
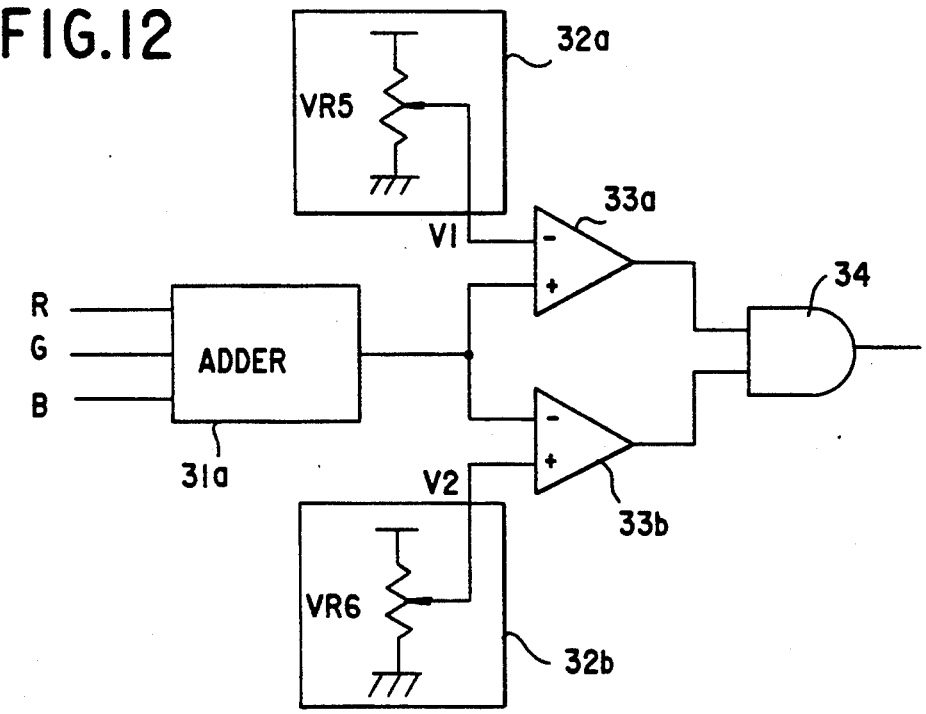
FIG. 12 is a circuit diagram of a brightness determination section of the present invention.

A circuit diagram for the brightness determination section is shown in FIG. 12. Each of the three primary color components of the video signal, "R", "G" and "B", are sent to an adder 31a to calculate the following operation; R+G+B. An output signal from the adder 31a and the brightness parameter V1 which was selected by a variable resistor VR5 are sent to a comparison circuit 33a to check the following brightness inequality;

$$V1 \leq R+G+$$

On the other hand, the output signal from the adder 31a and the brightness parameter V2 which was selected by a variable resistor VR6 are sent to a comparison circuit 33b to check the following brightness inequality;

$$R+G+B \leq V2.$$

The brightness parameters are selected in a range of $0 \leq V1 \leq V2 \leq 1$. The particular brightness region bounded between two brightness separation planes is expressed by the above inequalities. The brightness parameters of V1 and V2 are also selected to widen and narrow the particular brightness region. When the three primary color components of the video signal are included in the particular brightness region, an AND gate 34 outputs a binary signal "1" so that it provides the filtered image of the object having the particular brightness.

Figure 13:
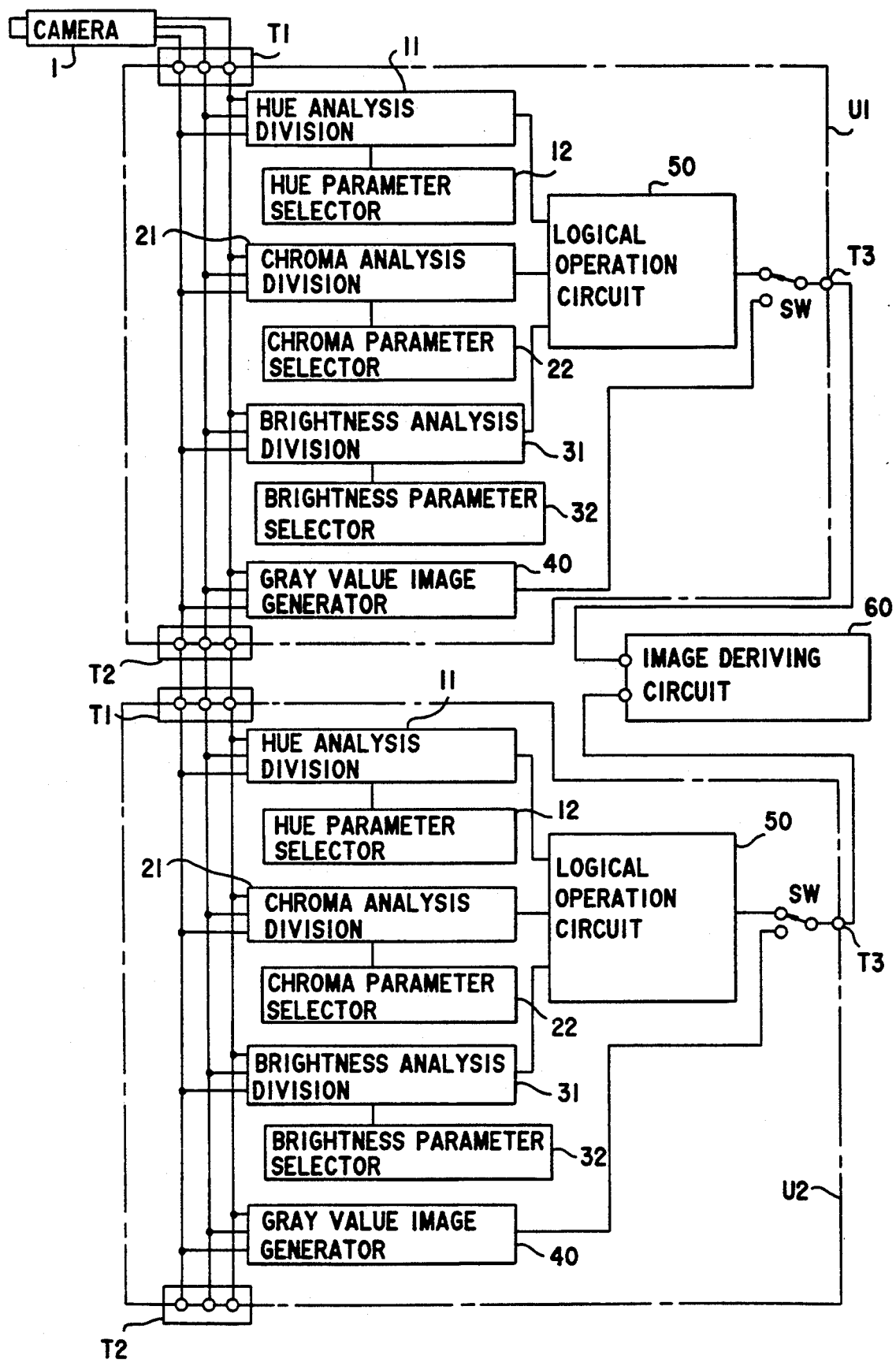
FIG. 13 is a block diagram of the color processing device with two pre-processing units.

Results from the hue determination section, the chroma determination section and the brightness determination section are sent to an AND gate of the logical operation circuit 50. If the results is included in the particular regions of hue, chroma and brightness, the binary signal "1" is provided to the image deriving circuit 60. If not, a binary signal "0" is provided. The image deriving circuit 60 provides a binary image of the object to derive geometrical characteristics including a location, area, and profile of the object. By the way, when some pre-processing units are connected, the pre-processing units can be selected to have different regions with respect to at least one of the hue, chroma and brightness regions so that the units provide individual outputs indicative of different filtered images. Thus obtained outputs can be then processed in the image deriving circuit 60 to provide a composite image reflecting the outputs from all of the pre-processing units. A block diagram of a color image processing device having two pre-processing units of U1 and U2 is shown in FIG. 13. Each of the pre-processing units has an input terminal T1 to receive the video signal from the color television camera, an output terminal T3 to provide the output from the logical operation circuit 50 and a feed terminal T2 for passing the video signal therethrough the input terminal of the other one of the pre-processing units. Each of the pre-processing units has also a gray value image generator 40 which provide a gray value image of the object based upon the video signal. Either an image signal from the gray value image generator 40 or the binary signal from the logical operation circuit 50 is sent to the image deriving circuit 60 by turning a switch SW. When the binary signal "1" is sent to the image deriving circuit 60, it provides the geometrical characteristics including a location, area, and profile of the object. On the other hand, when the image signal is sent to the image deriving circuit 60, it provides a television monitor for confirming focus or a visual field of the object.

| LIST OF REFERENCE NUMRERALS | |
|---|---|
| 1 color television camera | 26e comparison circuit |
| 10 hue determination section | 26f comparison circuit |
| 11 hue analysis division | 27 AND gate |
| 11a weighting circuit | 28 OR gate |
| 11b weighting circuit | 29 AND gate |
| 11c weighting circuit | SW switch |
| 11d weighting circuit | S1 chroma station |
| 12 hue parameter selector | S2 chroma station |
| 12a hue parameter selector | S3 chroma station |
| 12b hue parameter selector | VR3 variable resistor |
| 13a adder | VR4 variable resistor |
| 13b adder | 30 brightness determination section |
| 14a multiplier | 31 brightness analysis division |
| 14b multiplier | |
| 15a comparison circuit | 31a adder |
| 15b comparison circuit | 32 brightness parameter selector |
| 16 AND gate | |
| 17 hue selector | 32a brightness parameter selector |
| VR1 variable resistor | |
| VR2 variable resistor | 32b brightness parameter selector |
| 20 chroma determination section | |
| | 33a comparison circuit |
| 21 chroma analysis division | 33b comparison circuit |
| | 34 AND gate |
| 21a weighting circuit | VR5 variable resistor |
| 21b weighting circuit | VR6 variable resistor |
| 21c weighting circuit | 40 gray value image generator |
| 21d weighting circuit | |
| 21e weighting circuit | 50 logical operation circuit |
| 21f weighting circuit | |
| 21g weighting circuit | 60 image deriving circuit |
| 21h weighting circuit | T1 input terminal |
| 21i weighting circuit | T2 feed terminal |
| 22 chroma parameter selector | T3 output terminal |
| | U1 pre-processing unit |
| 22a chroma parameter selector | U2 pre-processing unit |
| 22b chroma parameter selector | |
| 23a adder | |
| 23b adder | |
| 23c adder | |
| 23d adder | |
| 24a multiplier | |
| 24b multiplier | |
| 25a function circuit | |
| 25b function circuit | |
| 25c function circuit | |
| 26a comparison circuit | |
| 26b comparison circuit | |
| 26c comparison circuit | |
| 26d comparison circuit | |

What is claimed is:

1. A process of extracting a particular color image of an object comprising the steps of:
    monitoring said object by a color television camera to provide a video signal including three primary color components;
    defining a color space by a rectangular coordinate system having three mutually perpendicular coordinates each designating each one of said three primary color components, said rectangular coordinate system having a color triangle which has its three vertices located on respective coordinates at points equidistant from the origin of said coordinate system;

selecting a spaced pair of chroma separation planes extending through the origin of said coordinate system and in parallel with one side of said color triangle so as to define a particular chroma region bounded between said chroma separation planes, each of said chroma separation planes being defined by the following equation [1]:

$$X-(Y+Z)/2 = C(X+Y+Z) \quad [0 \leq c \leq 1] \quad [1]$$

wherein X, Y, and Z are coordinates, respectively, of said rectangular coordinate system, and C is a chroma parameter which is varied to widen or narrow said particular chroma region, said chroma parameter C being determined by combining the following equation [2] into the equation [1]:

$$F(\alpha) = (1+n)|\alpha| - n\alpha \quad [2]$$

where $\alpha$ is $X-(Y+Z)/2$, $|\alpha|$ is an absolute value of $\alpha$, and n is selected in the following region:

$$0 \leq n \leq 0.5,$$

n being determined such that the pair of the chroma separation planes are selected on the opposite of said achromatic axis in such a manner as to define, in said chroma separation planes, respectively two colors which have the same chroma level but are of opposite hue to each other; and analyzing said video signal with respect to the three primary color components within said color space such that said video signal is determined to denote a particular chroma when the three primary color components are found to fall within said particular chroma region, wherein an extraction of said video signal as a particular color signal indicates a filtered image of said object with regard to said particular chroma.

2. A process of extracting a particular color image of an object comprising the steps of:

monitoring said object by a color television camera to provide a video signal including three primary color components;

defining a color space by a rectangular coordinate system having three mutually perpendicular coordinates each designating each one of said three primary color components, said rectangular coordinate system having an achromatic color axis extending through an origin of said coordinate system to designate a color with no hue and chroma, and having a color triangle which is perpendicular to said achromatic axis and has its three vertices located on respective coordinates at points equidistant from the origin of said coordinate system;

defining a particular chroma region within said color space between an outer triangular pyramid and an inner triangular pyramid, said inner triangular pyramid being located within said outer triangular pyramid, said outer triangular pyramid having three outer chroma separation planes which extend through the origin of said coordinate system and respectively through three outer lines which are selected within said color triangle to extend in parallel with the three sides of said color triangle, respectively, around said achromatic axis, and said inner triangular pyramid having three inner chroma separation planes which extend through the origin of said coordinate system and respectively through three inner lines which are selected within said color triangle to extend in parallel with the three sides of said color triangle, respectively, around said achromatic axis, each of said inner and outer chroma separation planes extending in parallel with a corresponding one of the three sides of said color triangle being defined by the following equation [1]:

$$X-(Y+Z)/2 = C(X+Y+Z) \quad [0 \leq c \leq 1] \quad [1]$$

wherein X, Y, and Z are coordinates, respectively, of said rectangular coordinate system, and C is a chroma parameter which is varied to widen or narrow said particular chroma region, said chroma parameter C being determined by combining the following equation [2] into the equation [1]:

$$F(\alpha) = (1+n)|\alpha| - n\alpha \quad [2]$$

where $\alpha$ is $X-(Y+Z)/2$, $|\alpha|$ is an absolute value of $\alpha$, and n is selected in the following region:

$$0 \leq n \leq 0.5; \text{ and}$$

analyzing said video signal with respect to the three primary color components within said color space such that said video signal is determined to denote a particular chroma when the three primary color components are found to fall within said particular chroma region, wherein an extraction of said video signal as a particular color signal indicates a filtered image of said object with regard to said particular chroma.

3. A process of extracting a particular color image of an object comprising the steps of:

monitoring said object by a color television camera to provide a video signal including three primary color components;

defining a color space by a rectangular coordinate system having three mutually perpendicular coordinates each designating each one of said three primary color components, said rectangular coordinate system having an achromatic color axis extending through an origin of said coordinate system to designate a color with no hue and chroma, and having a color triangle which is perpendicular to said achromatic axis and has its three vertices located on respective coordinates at points equidistant from the origin of said coordinate system;

defining a particular chroma region within said color space between an outer hexagonal pyramid and an inner hexagonal pyramid, said inner hexagonal pyramid being located within said outer hexagonal pyramid, said outer hexagonal pyramid having six outer chroma separation planes which extend through the origin of said coordinate system and respectively through six outer lines which are selected within said color triangle in three pairs with each pair including two parallel lines arranged on opposite of said achromatic axis in a parallel relation commonly with each one of the three sides of said color triangle, and said inner hexagonal pyramid having six inner chroma separation planes which extend through the origin of said coordinate system and respectively through six inner lines which are selected within said color triangle in three pairs with each pair including two parallel lines arranged on opposite of said achromatic axis in a parallel relation commonly with each one of the three sides of said color triangle, each of said inner and outer chroma separation planes in parallel with a corresponding one of the three sides of said color triangle being defined by the following equation [1]:

$$X-(Y+Z)/2 = C(X+Y+Z) \quad [0 \leq c \leq 1] \tag{1}$$

wherein X, Y, and Z are coordinates, respectively, of said rectangular coordinate system, and C is a chroma parameter which is varied to widen or narrow said particular chroma region, said chroma parameter C being determined by combining the following equation [2] into the equation [1]:

$$F(\alpha) = (1+n)|\alpha| - n\alpha \tag{2}$$

where $\alpha$ is $X-(Y+Z)/2$, $|\alpha|$ is an absolute value of $\alpha$, and n is selected in the following region:

$$0 \leq n \leq 0.5; \text{ and}$$

analyzing said video signal with respect to the three primary color components within said color space such that said video signal is determined to denote a particular chroma when the three primary color components are found to fall within said particular chroma region, wherein an extraction of said video signal as a particular color signal indicates a filtered image of said object with regard to said particular chroma.

* * * * *